United States Patent Office
2,890,210
Patented June 9, 1959

2,890,210

COMPOSITIONS COMPRISING EPOXIDES AND ACID ANHYDRIDES

Benjamin Phillips, Charleston, Frederick C. Frostick, Jr., South Charleston, Charles W. McGary, Jr., Charleston, and Charles T. Patrick, Jr., St. Albans, W. Va., assignors to Union Carbide Corporation, a corporation of New York No Drawing. Application May 24, 1956
Serial No. 586,932

54 Claims. (Cl. 260—78.4)

This invention relates to novel polymerizable, curable, compositions; polymerized, cured, compositions prepared therefrom and methods of producing the same. More particularly, this invention is directed to novel polymerizable, curable epoxy resin compositions useful in the arts of molding, coatings, laminating, adhesives, castings and the like.

The noxel compositions of the present invention are directed to polymerizable, curable, compositions comprising (a) a 3,4-epoxycyclohexylmethyl 3,4-epoxycyclohexanecarboxylate; (b) a polycarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide, wherein $x$ is a number in the range of from 0.1 to 4.0; $y$ is a number in the range of from 0.0 to 1.0; the sum of $x$ and $y$ is not greater than 4.0 and $x/y$ is at least 1.

Preferred compositions of this invention are directed to polymerizable, curable, compositions comprising (a) a 3,4-epoxycylcohexylmethyl 3,4-epoxycyclohexanecarboxylate; (b) a polycarboxylic acid anhydride, and preferably a dicarboxylic acid anhydride, in an amount having $x$ carboxylic equivalents per epoxy equivalent of said diepoxide; and (c) a polycarboxylic acid in an amount having $y$ carboxyl equivalents per epoxy equivalent of said diepoxide wherein $x$ is a number in the range of from 0.5 to 2.0; $y$ is a number in the range of from 0.0 to 1.0, the sum of $x$ and $y$ is not greater than 2.0 and $x/y$ is at least 1.

Particularly preferred compositions to which this invention is directed are compositions comprising (a) a lower alkyl substituted 3,4-epoxycyclohexylmethyl 3,4-epoxycyclohexanecarboxylate; (b) a dicarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide wherein $x$ is a number in the range of from 0.1 to 4.0; $y$ is a number in the range of from 0.0 to 1.0; the sum of $x$ and $y$ is not greater than 4.0 and $x/y$ is at least 1.

Most particularly preferred compositions to which this invention is directed are compositions comprising (a) 3,4-epoxy-6-methylcyclohexylmethyl 3,4-epoxy-6-methylcyclohexanecarboxylate; (b) a dicarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide wherein $x$ is a number in the range of from 0.1 to 4.0 and preferably in the range of from 0.5 to 2.0; $y$ is a number in the range of from 0.0 to 1.0; the sum of $x$ and $y$ is not greater than 4.0 and preferably 2.0 and $x/y$ is at least 1.

The novel compositions of this invention also include and are directed to the cured compositions hereinbefore referred to.

Preferred embodiments of this invention comprise the cured resin compositions containing a plurality of interconnecting units corresponding to the general formula:

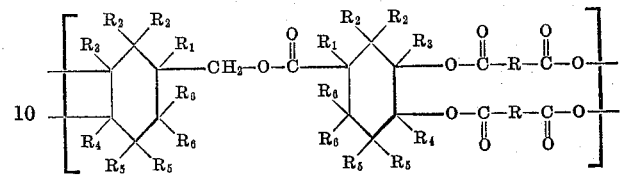

wherein $R_1$ through $R_6$ represent hydrogen and alkyl groups and preferably lower alkyl groups and R represents the residue of a dicarboxylic acid.

It will be noted that at each epoxide site in the starting material there is made available a site for initiation of a linear type chain and also makes available another site for cross-linking purposes. The cross-linking can be accomplished by reaction with other epoxides such as diepoxides and polyepoxides; dibasic acids and the like.

The present invention is based on the discovery that thermosetting, rigid, moldable, solid, polyester type compositions can be obtained by heating, in the presence or absence of a catalyst, a 3,4-epoxycyclohexylmethyl 3,4-epoxycyclohexanecarboxylate and a polycarboxylic acid anhydride, and preferably a dicarboxylic acid anhydride, in molar proportions of 0.10 to 4.0 moles of anhydride per mole of diepoxide. It has also been discovered that on further heating in the presence or absence of a catalyst these compositions are converted into hard, transparent, water resistant, infusible, scratch resistant resins having superior high temperature characteristics making them admirably suitable for use in industrial applications where high heat distortion points are a prime requisite such as, for example, in laminates and moldings subject to high temperature uses.

It has also been discovered that the diepoxidepolycarboxylic acid anhydride systems can be modified, so as to obtain a variety of useful physical properties, by the inclusion or addition of a polycarboxylic acid compound, such as carboxylic acids and acid esters, in an amount from 0.0 to 1.0 moles of polycarboxylic acid compound per mole of diepoxide.

The proportions of the reactants employed in preparing the novel compositions of this invention are preferably expressed in terms of available carboxyl groups or carboxyl equivalent per available epoxy group or epoxy equivalent. By the term "carboxyl equivalent," as employed herein, is meant the number of carboxyl groups contained by an amount of a polycarboxylic compound. For example, the "carboxyl equivalent" of a dicarboxylic acid is two. In the case of a dicarboxylic acid anhydride, the term "carboxyl equivalent" is meant to indicate the number of carboxyl groups which would be contained by an amount of the corresponding dicarboxylic acid. Thus, for example, one mole of a dicarboxylic acid anhydride would have a "carboxyl equivalent" of two. Also, as employed herein, the term "epoxy equivalent" is intended to represent the number of epoxy groups,

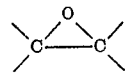

contained by an amount of epoxide compound. Thus, in the diepoxide-polycarboxylic acid anhydride systems modified or unmodified by the addition of a polycarboxylic acid compound, the terms $x$ and $y$ are employed to signify carboxyl equivalents of the anhydride and acid compounds, respectively, per epoxide equivalent. Thus, since it has been discovered that useful compositions are obtained employing molar proportions in the range of 0.1 to 4.0 moles of anhydride per mole of diepoxide, $x$ will be a number in the range of 0.1 to 4.0 carboxyl equivalents per epoxy equivalent. Upon the addition, if desired, of a modifying polycarboxylic acid compound, the amount of polycarboxylic acid anhydride must, of course, be correspondingly decreased. Thus, it has been discovered that useful compositions are obtainable by the addition to the diepoxide-anhydride systems of from 0.0 to 1.0 mole of polycarboxylic acid compound per mole of diepoxide, $y$, therefore, will be a number in the range of from 0.0 to 1.0 carboxyl equivalents per epoxy equivalent. The sum of $x$ plus $y$ is not greater than 4.0, since it has been obseved that resins obtained outside of the range are unsuitable because they are heterogeneous in composition. Furthermore the ratio of $x/y$ must be at least 1, since the polycarboxylic acid anhydride is a major component of the system.

The initial diepoxide-anhydride systems of the present invention, either modified or unmodified, by the addition of a polycarboxylic compound, are fluid, having viscosities of less than about 25 centipoises at working temperatures. The reaction rate and physical properties are equally as good as, if not better than, commercially available epoxide systems.

Theoretically, the diepoxides are tetrafunctional with dicarboxylic acid anhydrides and difunctional with polycarboxylic acid compounds but, practically, other competing reactions can also occur thereby reducing the amount of the polycarboxylic acid anhydride or polycarboxylic acid compound necessary to produce useful compositions. While not wishing to be bound by any particular theory or mechanism of reaction, the amounts of dicarboxylic acid anhydride and polycarboxylic acid specified in $x$ and $y$, referred to above, can probably be explained as due to etherification and perhaps rearrangement of epoxides.

The diepoxides used in preparing the novel compositions of this invention include the 3,4-epoxycyclohexylmethyl 3,4-epoxycyclohexanecarboxylates and are free of functional groups other than epoxy. They are readily prepared by the action of peracetic acid and an unsaturated cycloaliphatic ester such as, 3-cyclohexenylmethyl 3-cyclohexenecarboxylate. These unsaturated cycloaliphatic esters are also readily prepared by subjecting selected cyclic unsaturated aldehydes to the Tischenko reaction in the presence of an aluminum alkoxide catalyst. The 3,4-epoxycyclohexylmethyl 3,4-epoxycyclohexanecarboxylates obtainable by this procedure include 3,4-epoxycyclohexylmethyl 3,4-epoxycyclohexanecarboxylate and the alkyl-substituted, and preferably the lower, alkyl-substituted homologs thereof such as for example, 3,4-epoxy-1 - methylcyclohexylmethyl 3,4 - epoxy - 1 - methylcyclohexanecarboxylate, 3,4-epoxy-2 or 5-methylcyclohexylmethyl 3,4-epoxy-2 or 5-methylcyclohexanecarboxylate, 3,4-epoxy-3-methylcyclohexylmethyl 3,4-epoxy-3-methylcyclohexanecarboxylate, 3,4-epoxy-4-methylcyclohexylmethyl 3,4-epoxy-4-methylcyclohexanecarboxylate, and 3,4 - epoxy - 6 - methylcyclohexylmethyl 3,4 - epoxy - 6 - methylcyclohexanecarboxylate.

The polycarboxylic acid anhydrides used in preparing the novel compositions of this invention include any and all anhydrides whether aliphatic, aromatic or cycloaliphatic in nature. The preferred anhydrides are the dicarboxylic acid anhydrides and preferably the hydrocarbon dicarboxylic acid anhydrides which include for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 1,2,4,5-benzenetetracarboxylic dianhydride, citraconic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride. Mixtures of anhydrides, polymeric anhydrides or mixed polymeric anhydrides of sebacic, adipic, pimelic, cyclohexane 1,4-dicarboxylic, terephthalic and isophthalic acids are also useful in preparing the novel compositions of this invention.

The polycarboxylic acids which can be used in preparing the novel compositions of this invention include aliphatic, aromatic and cycloaliphatic dicarboxylic acids such as, for example, oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, glutonic acid, muconic acid, ethylidenemalonic acid, isopropylidenemalonic acid, allylmalonic acid, 1,2-cyclohexanedicarboxylic acid, 1,4-cyclohexanedicarboxylic acid, 2-carboxy-2-methylcyclohexaneacetic, phthalic acid, isophthalic acid, terephthalic acid, 1,8-naphthalenedicarboxylic acid, 3-carboxycinnamic acid, 1,2-naphthalene dicarboxylic acid, tetrahydrophthalic acid, and tetrachlorophthalic acid. Preferred aliphatic dicarboxylic acids include aliphatic dibasic acids containing from five through ten carbon atoms. Other suitable polycarboxylic acid compounds include tricarboxylic acids such as 1,1,5-pentanetricarboxylic acid, 1,2,4-hexane-tricarboxylic acid, 2-propyl-1,2,4-pentanetricarboxylic acid, 5-octene - 3,3, 6 -tricarboxylic acid, 1,2,3-propanetricarboxylic acid, 1,2,4-benzenetricarboxylic acid and the like. Mixtures of polycarboxylic acids can be employed if desirable. Other suitable polycarboxylic acid compounds include acid-esters or polycarboxy polyesters containing carboxylic acid end groups prepared by the reaction of a polycarboxylic acid or a polycarboxylic acid anhydride and a polyhydric alcohol. Typical polyhydric alcohols which can be reacted with any of the above-mentioned polycarboxylic acids or polycarboxylic acid anhydrides to provide polycarboxy polyesters containing carboxylic acid end groups suitable for use in preparing the novel compositions of this inevntion include ethylene glycol, diethylene glycol, triethylene glycol, tetraethylene glycol, 1,2-propylene glycol, 1,3-propylene glycol, dipropylene glycol, tripropylene glycol, 1,2-butylene glycol, 1,4-butanediol, 1,5-pentanediol, 2,4-pentanediol, 2,2-dimethyl-1,3-propanediol, 1,5-hexanedial, 2,5-hexanediol, 1,6-hexanediol, 3-methyl-1,5-pentanediol, 2-methyl - 2,5 - pentanediol, 3-methyl-2,5-pentanediol, 1,4-hexanediol, 2,2-diethyl-1,3-propanediol, 2-methoxymethyl-2,4-dimethyl-1,5-pentanediol, 2-ethoxymethyl-2,4-dimethyl-1,5-pentanediol, 2-ethyl-1,3-hexanediol, 2,5-dimethyl-2,5-hexanediol, 1,12-octadecanediol, glycerol, 1,2,6-hexanetriol 1,1,1-trimethylol propane, trimethylol methane, pentaerythritol, dipentaerythritol, diglycerol, pentaglycerol, sorbitol, mannitol, polyvinyl alcohol of varying molecular weights and the like.

Preferred polycarboxy polyesters containing carboxyl end groups are those prepared from the dicarboxylic acids or dicarboxylic acid anhydrides enumerated above and dihydric, trihydric and tetrahydric alcohols.

The ratios, in which the dicarboxylic acid or dicarboxylic acid anhydride can be reacted with polyhydric alcohols of the type referred to above, are limited to those which provide carboxyl end groups. Thus, the dicarboxylic acid or dicarboxylic acid anhydride must be reacted with the polyhydric alcohol in greater than equivalent amounts and care must be taken, in the case of tri and tetrafunctional reactants, that gelation does not occur due to the formation of crosslinked polyesters. It has been discovered that suitable polyesters can be prepared provided the mole ratio ranges prescribed in the accompanying Table I are observed:

TABLE I

| Alcohol | Mole Ratio of Acid of Anhydride/Alcohol | |
|---|---|---|
| | Usable | Preferred |
| dihydric | 1.1 to 2.0 | 1.5 to 2.0 |
| trihydric | 2.2 to 3.0 | 2.5 to 3.0 |
| tetrahydric | 3.3 to 4.0 | 3.5 to 4.0 |

The process of this invention is carried out, generally, by heating to a temperature of about 50° C. to 250° C., a mixture comprising a 3,4-epoxycyclohexylmethyl 3,4-epoxycyclohexanecarboxylate and a polycarboxylic acid anhydride. The preferred minimum temperature is that temperature at which the particular reaction mixture forms a homogeneous mass. Thus, with aliphatic anhydrides, temperatures of at least 50° C. are preferred, while with higher-melting aromatic anhydrides, such as, phthalic anhydride, temperatures of about 100° C. to 110° C. are required. The temperature required for gelation within reasonable times is a temperature in the range of from 100° C. to 180° C. The heating times for gelation to occur generally vary from five minutes to five hours. This gelation time, however, can be significantly reduced by the use of various catalysts to accelerate the reaction. Typical catalysts include both acids and bases such as acetic acid, sulfuric acid, stannic chloride, perchloric acid, pyridine, aniline, benzyldimethylamine, benzyltrimethylammonium hydroxide and dilute sodium hydroxide. Preferably these catalysts are employed in an amount in the range of from 0.001 to 5.0 percent based on the weight of the total reactants.

The curing of the gelated product may be allowed to proceed at the selected temperature or, if desired, a more rapid cure can be had by raising the temperature as high as 250° C. It has been found that the time required for the formation of a hard, transparent and insoluble resin generally varies from five to ten minutes up to two to six hours, depending on whether a catalyst is used; the amount of the catalyst present and the temperature employed.

It has been found that in certain instances that the polycarboxylic acid compound and also the polycarboxylic acid anhydride reacts so rapidly that a completely homogeneous mass cannot be formed prior to gelation. But, however, the acid or anhydride may be suitably dissolved in a solvent so that the reaction is slowed down to allow for the formation of a homogeneous mass.

The following examples will serve to illustrate the practice of the invention.

*Example 1.—Preparation of 3,4-epoxycyclohexylmethyl 3,4-epoxycyclohexanecarboxylate*

To 144 grams (0.655 mole) of 3-cyclohexenylmethyl 3-cyclohexenecarboxylate in a 1-liter flask was added dropwise over a period of two and one-fourth hours 488 grams of a 25.5 percent solution of peracetic acid in acetone (124 grams, 1.64 moles, of peracetic acid). The stirred reaction solution was maintained at 20° C.–25° C. by immersing the reaction flask in a cold water bath. After the addition was complete, the reaction flask was immersed in a cold bath (−11° C.) and allowed to stand for 16 hours. The contents of the flask were then added dropwise to a still kettle containing ethyl benzene refluxing under reduced pressure at 40° C.–45° C. kettle temperature. During the addition, there was distilled off at the head a mixture of acetone, acetic acid, peracetic acid and ethyl benzene. After addition was complete, the remaining low-boiling materials were distilled off, and there was obtained 164 grams of residue product analyzing 86 percent purity as 3,4-epoxycyclohexylmethyl 3,4-epoxycyclohexanecarboxylate by determination of epoxide groups, 10.7 percent unreacted 3-cyclohexenylmethyl 3-cyclohexenecarboxylate by determination of double bonds, and 0.2 percent acidic impurities calculated as acetic acid. The yield of diepoxide was 85.5 percent.

*Example 2.—Preparation of 3,4-epoxy-1-methylcyclohexylmethyl 3,4-epoxy-1-methylcyclohexanecarboxylate*

To 84 grams (0.338 mole) of 1-methyl-3-cyclohexenylmethyl 1-methyl-3-cyclohexenecarboxylate in a one-liter flask were added dropwise over a period of one and one-half hours 308 grams of a 25 percent solution of peracetic acid in acetone (77 grams, 1.01 moles, of peracetic acid). The stirred reaction solution was maintained at 35° C.–40° C. by immersing the reaction flask in a water bath. After the addition was complete, the reaction solution was stirred at 35° C.–40° C. for 1½ hours and then stored at −11° C. for 16 hours. Analysis at this time indicated 89.6 percent of the theoretical amount of peracetic acid had reacted. The reaction solution was heated to 40° C. and stirred for another two hours at which time analysis for peracetic acid showed 94.5 percent had reacted. The solution was added dropwise to a still kettle containing 4400 grams of ethylbenzene refluxing under reduced pressure at 40° C.–45° C. kettle temperature. During the addition, there was distilled off at the head a mixture of acetone, acetic acid, peracetic acid and ethylbenzene. After addition was complete, the remaining low-boiling materials were distilled off, and there was obtained 97 grams of residue product analyzing 82 percent 3,4-epoxy-1-methylcyclohexylmethyl 3,4-epoxy-1-methylcyclohexanecarboxylate by determination of epoxide groups, 1.6 percent unreacted 1-methyl-3-cyclohexenylmethyl 1-methyl-3-cyclohexenecarboxylate by determination of double bonds, and 0.2 percent acidic impurities calculated as acetic acid. The yield of diepoxide was 84 percent.

The residue product (75 grams) was distilled without fractionation to yield 67 grams of colorless liquid, B.P. 180° C.–195° C. at 3 mm., $n_D^{30}$ 1.4855, which analyzed 83.5 percent 3,4-epoxy-1-methylcyclohexylmethyl 3,4-epoxy-1-methylcyclohexanecarboxylate by analysis for epoxide groups and 1.95 percent 1-methyl-3-cyclohexenylmethyl 1-methyl-3-cyclohexenecarboxylate by analysis for double bonds.

*Example 3.—Preparation of 6-methyl-3,4-epoxycyclohexylmethyl 6-methyl-3,4-epoxycyclohexanecarboxylate*

To 620 grams (2.5 moles) of 6-methyl-3-cyclohexenylmethyl 6-methyl-3-cyclohexenecarboxylate in a 5-liter flask were added dropwise over a period of six and one-half hours 2690 grams of a 21.6 percent solution of peracetic acid in acetone (570 grams, 7.5 moles, of peracetic acid). The contents of the flask were stirred and maintained at 40° C. during the addition by immersing the reaction flask in a water bath. After addition was complete, the reaction conditions were maintained for an additional one-half hour and then the reaction flask was immersed in a cold bath at −11° C. for 16 hours. Analysis at the end of this period indicated 98.7 percent of the theoretical amount of peracetic acid was used up. The reaction solution was then heated to 42° C. and maintained there for an additional one and one-half hours, and then analysis indicated 100 percent of the theoretical amount of peracetic acid had been consumed.

The reaction solution was then added dropwise to a still kettle containing 1400 grams of ethyl benzene refluxing at 25 mm. pressure. Acetone, peracetic acid, acetic acid and ethyl benzene were distilled off at the head during the addition, and after addition was complete all low-boiling material was stripped off up to a kettle temperature of 60° C. at 1 mm. There was obtained 736 grams of residue product which analyzed 85.4 percent purity as 6-methyl-3,4-epoxycyclohexylmethyl 6-methyl-3,4-epoxycyclohexanecarboxylate by determination of epoxide groups, 3.1 percent as unreacted 6-methyl-3-cyclohexenemethyl 6-methyl-3-cyclohexanecarboxylate by determination of double bonds, and 0.3 percent acidity as acetic acid. The yield corresponded to 89.8 percent.

By distilling a sample of the crude diepoxide under reduced pressure there was obtained a purified product. It was a colorless, sweet-smelling liquid having the following properties: B.P. 335° C. at 760 mm., 185° C.–186° C. at 3 mm.; $n_D^{30}$ 1.4880.

*Example 4.—Preparation of 3,4-epoxy-(3 and/or 4)-methylcyclohexylmethyl 3,4-epoxy-(3 and/or 4)-methylcyclohexanecarboxylate*

The Diels-Alder adduct of isoprene and acrolein was subjected to a Tischenko condensation as described in Example 1. Upon distillation under reduced pressure there was obtained in good yield (3 and/or 4)-methyl-3-cyclohexenylmethyl (3 and/or 4)-methyl-3-cyclohexenecarboxylate, a colorless liquid boiling at 160° C.–164° C. at 3 mm. pressure. To 0.371 mole of this mixture of isomeric esters was added a 25 percent peracetic acid (1.11 moles) solution in acetone over a period of 1.33 hours at 40° C. After an additional 2 hour reaction period the reaction mixture was added to 500 cc. of ethylbenzene (to facilitate removal of the acetic acid) and distilled. The product was a mixture of isomers boiling at 187° C.–195° C. at 3 mm. and having a refractive index range of 1.4822–1.4822–1.4830 ($n_D^{30}$). The purity, as determined by an analysis for epoxide groups by the pyridine hydrochloride method, was 95 percent calculated as 3,4-epoxy-(3 and/or 4)-methylcyclohexylmethyl 3,4-epoxy-(3 and/or 4)-methylcyclohexanecarboxylate.

*Example 5.—Preparation of 3,4-epoxy-2-methylcyclohexylmethyl 3,4-epoxy-2-methylcyclohexanecarboxylate*

The Diels-Alder adduct of piperylene and acrolein was subjected to a Tischenko condensation as described in Example 1. Upon distillation under reduced pressure there was obtained in good yield 2-methyl-3-cyclohexenylmethyl 2-methyl-3-cyclohexenecarboxylate, a colorless liquid boiling at 146° C.–147° C. at 3.0 mm. and having a refractive index of 1.4906 ($n_D^{30}$). To 0.387 mole of this ester was added over a period of 1.67 hours a 25 percent solution of peracetic acid (1.16 moles) in acetone at 40° C. After an additional two hours reaction period the reaction mixture was added to 500 cc. of ethylbenzene (to facilitate the removal of acetic acid) and the volatile components were removed to a kettle temperature of 70° C. at 3 mm. pressure. The residue product (108 grams) analyzed 90 percent of the corresponding diepoxide. The residue product was fractionated on a short column and gave a 79 percent yield of 3,4-epoxy-2-methyl-cyclohexylmethyl 3,4-epoxy-2-methylcyclohexanecarboxylate, a colorless liquid having a boiling point of 183° C.–185° C. at 2 mm. and a refractive index of 1.4927 ($n_D^{30}$). The purity was 99.5 percent as determined by a pyridine hydrochloride analysis for epoxide.

*Example 6.—The reaction of phthalic anhydride with 3,4-epoxy-6-methylcyclohexylmethyl 3,4-epoxy-6-methylcyclohexanecarboxylate*

A mixture comprising equal molar quantities of phthalic anhydride (17.2 grams) and 3,4-epoxy-6-methylcyclohexylmethyl 3,4-epoxy-6-methylcyclohexanecarboxylate (32.8 grams) was heated until homogeneous and then poured into a mold at 120° C. The mixture was heated to a temperature of 120° C. and gelled in three hours. The product was cured at a temperature of 120° C. for a period of 17 hours, after which the resinous amber-colored product was examined and tested and had the following physical properties.

Izod impact (ft. lb./in. notch) 25° C.[1] _____ 0.27
Heat distortion (264 p.s.i.)[2] _____° C__ over 171
Flexural modulus [3] _____ 0.48 × 10⁶

[1] ASTM Method D-256-47 T.
[2] ASTM Method D-648-45 T.
[3] ASTM Method D-790-49 T.

*Example 7.—The reaction of succinic anhydride with 3,4-epoxy-6-methylcyclohexylmethyl 3,4-epoxy-6-methylcyclohexanecarboxylate*

A mixture comprising succinic anhydride (14.4 grams) and 3,4-epoxy-6-methylcyclohexylmethyl 3,4-epoxy-6-methylcyclohexanecarboxylate (35.6 grams) in the mole ratio of 1.13 to 1.0 was heated at a temperature of 140° C. for a period of 15.5 hours. A hard amber-colored resin was produced and is characterized by the following physical properties.

Izod impact (ft. lb./in. notch) 25° C _____ 0.33
Heat distortion (264 p.s.i.) _____° C__ 134
Flexural modulus _____ 0.33 × 10⁶

*Example 8.—The reaction of maleic anhydride with 3,4-epoxy-6-methylcyclohexylmethyl 3,4-epoxy-6-methylcyclohexanecarboxylate*

A mixture comprising equal molar amounts of maleic anhydride (10.2 grams) and 3,4-epoxy-6-methylcyclohexylmethyl 3,4-epoxy-6-methyl cyclohexanecarboxylate (39.7 grams) was heated until homogeneous, whereupon the temperature was raised to 140° C. for a period of 22 hours. The amber-colored resinous product was hard and insoluble in common organic solvents and had a Barcol hardness of 42.

Another mixture comprising maleic anhydride (1.47 grams) was mixed with 3,4-epoxy-6-methylcyclohexylmethyl 3,4-epoxy-6-methylcyclohexanecarboxylate (2.8 grams) in the mole ratio of 1.5 to 1.0 in the presence of 0.25 percent by weight of benzyldimethylamine catalyst. The mixture was heated slowly until homogeneous and allowed to stand at room temperature. At the end of the week, the mixture had gelled to a hard, amber resin.

*Example 9.—Reactivity of 3,4-epoxy-6-methylcyclohexylmethyl 3,4-epoxy-6-methylcyclohexanecarboxylate with various anhydrides and the effect of benzyldimethylamine as a catalyst*

The reactivity of various dicarboxylic anhydrides with 3,4-epoxy-6-methylcyclohexylmethyl 3,4-epoxy-6-methylcyclohexanecarboxylate as judged by the time necessary for gelation, was determined by using a mole ratio of 1.5 moles of anhydride to 1 mole of the diepoxide. The following tabulated data illustrates gel times in the absence of catalyst and with 0.6 percent benzyldimethylamine catalyst at a temperature of 110° C.

| Anhydride | q.[1] | Gel Time, hrs. | |
|---|---|---|---|
| | | No Catalyst | Benzyldimethylamine |
| Phthalic | 1.1 | 4.0 | 0.17 |
| Maleic | 0.74 | 3.0 | 0.6 |
| Dichloromaleic | [2] 2.53 | 0.2 | |
| Succinic | 0.75 | 3.3 | 0.78 |
| Tetrahydrophthalic | 1.27 | 3.7 | 1.3 |

[1] For 1.40 g. 3,4-epoxy-6-methylcyclohexylmethyl 3,4-epoxy-6-methylcyclohexanecarboxylate.
[2] For 2.80 g. 3,4-epoxy-6-methylcyclohexylmethyl 3,4-epoxy-6-methylcyclohexanecarboxylate.

*Example 10.—Effect of variation in the mole ratio of phthalic anhydride to 3,4-epoxy-6-methylcyclohexylmethyl 3,4-epoxy-6-methylcyclohexanecarboxylate*

Various amounts of phthalic anhydride were mixed with 3,4-epoxy-6-methylcyclohexylmethyl 3,4-epoxy-6- methylcyclohexanecarboxylate, dissolved by heating in glass tubes and placed in an oven at a temperature of 180° C. The samples gelled in five to ten minutes, except for the ones with less than 0.1 mole of phthalic anhydride to 1 mole of 3,4-epoxy-6-methylcyclohexylmethyl 3,4-epoxy-6-methylcyclohexanecarboxylate, which required somewhat longer periods of time. After curing for three hours at 180° C. the following observations were made.

| Mole Ratio, Anhydride/EP-201 | Appearance after 2 hours cure at 180° C. |
|---|---|
| 0.10 | soft. |
| 0.50 | hard. |
| 2.5 | hard. |
| 3.0 | fairly hard. |
| 4.0 | soft. |
| 6.0 | hard, weak, opaque. |

The above data indicate that resins having a mole ratio of anhydride to diepoxide in the range of from 0.10 to 4.0 are satisfactory and that resins produced having higher mole ratios of anhydride to diepoxide would be unsuitable for most applications.

*Example 11.—Effect of various catalysts on the reaction of phthalic anhydride with 3,4-epoxy-6-methylcyclohexylmethyl 3,4-epoxy-6-methylcyclohexanecarboxylate*

Phthalic anhydride (1.10 grams) was mixed with 3,4-epoxy-6-methylcyclohexylmethyl 3,4-epoxy-6-methylcyclohexanecarboxylate (1.40 grams) in the mole ratio of 1.5 mole to 1 mole. Small quantities of benzyldimethylamine, potassium hydroxide in ethanol, stannic chloride in ethylacetate and ethylbutenylsuccinic acid were placed in separate samples and the mixtures heated until homogeneous. The time required for gelation was observed at a temperature of 110° C. and was taken as a measure of the effectiveness of the catalyst.

| Catalyst | Conc. Catalyst, Wt. percent | Gel time, 110° |
|---|---|---|
| None | None | 7 hours. |
| Benzyldimethylamine | 0.6 | 10 minutes. |
| Potassium hydroxide | 0.1 | 10 minutes. |
| Stannic chloride | 0.01 | 45 minutes. |
| Ethylbutenylsuccinic acid | 5 | 1.7 hours. |

*Example 12.—Reaction of methyltetrahydrophthalic anhydride with 3,4-epoxy-6-methylcyclohexylmethyl 3,4-epoxy-6-methylcyclohexanecarboxylate*

A liquid mixture of isomers of methyltetrahydrophthalic anhydride (23.5 grams), prepared from a mixture of isoprene, piperylene, and maleic anhydride, was mixed with 3,4-epoxy-6-methylcyclohexylmethyl 3,4-epoxy-6-methylcyclohexanecarboxylate (26.4 grams) in the ratio of 1.5 moles to 1.0 mole of 3,4-epoxy-6-methylcyclohexylmethyl 3,4-epoxy-6-methylcyclohexanecarboxylate. The solution was homogeneous and fluid at room temperature. When heated to 110° C., gelation occurred after nine hours. With benzyldimethylamine (0.6 percent by weight) the time for gelation was reduced to 75 minutes. The resin was cured for 12 hours at 120° C. and for an additional four hours at a temperature of 160° C. and had a heat distortion point (264 p.s.i.) of 165° C.

*Example 13.—Reaction of polymeric adipic anhydride with 3,4-epoxy-6-methylcyclohexylmethyl 3,4-epoxy-6-methylcyclohexanecarboxylate*

Polymeric adipic anhydride was mixed with 3,4-epoxy-6-methylcyclohexylmethyl 3,4-epoxy-6-methylcyclohexanecarboxylate in the ratio of 1.5 moles of the anhydride to 1.0 mole of 3,4-epoxy-6-methylcyclohexylmethyl 3,4-epoxy-6-methylcyclohexanecarboxylate. The mixture was heated to a temperature of 110° C. and gelation occurred after 5.7 hours. After an additional period of 22 hours at 110° C., an amber-colored resin was produced having a Barcol hardness of 22.

*Example 14.—The reaction of succinic anhydride with 3,4-epoxy-6-methylcyclohexylmethyl 3,4-epoxy-6-methylcyclohexanecarboxylate modified by the addition of adipic acid*

Succinic anhydride (12.9 grams), adipic acid (4.78 grams), and 3,4-epoxy-6-methylcyclohexylmethyl 3,4-epoxy-6-methylcyclohexanecarboxylate (33.3 grams) were combined in the mole ratio of 1:0.25:1 and heated slowly until homogeneous. The ternary system gelled in the period of 30 minutes at a temperature of 120° C. and was cured for a total of 2.2 hours at 120° C. and for an additional period of two hours at 160° C. A hard, light yellow resin was produced, characterized by the following physical properties:

Izod impact (ft. lb./in. notch), 25° C _____ 0.3
Heat distortion (264 p.s.i.) _____ °C __ 120
Flexural modulus _____ $0.395 \times 10^6$

*Example 15.—Reaction of alkyl- and alkenylsuccinic anhydrides with 3,4-epoxy-6-methylcyclohexylmethyl 3,4-epoxy-6-methylcyclohexanecarboxylate*

Heptyl succinic anhydride and pentenyl succinic anhydride were reacted respectively with 3,4-epoxy-6-methylcyclohexylmethyl 3,4-epoxy-6-methylcyclohexanecarboxylate in the mole ratio of 1.5 moles of anhydride per mole of diepoxide. These systems gelled in thirty hours at 110° C. The same systems with 0.6 percent by weight of benzyldimethylamine gelled in four and two hours respectively at 110° C. Upon further heating the resins cured to fairly hard products.

*Example 16.—Reaction of succinic and phthalic anhydrides with 3,4-epoxycyclohexylmethyl 3,4-epoxy cyclohexanecarboxylate*

Succinic anhydride (0.75 gram) was mixed with 3,4-epoxycyclohexylmethyl 3,4-epoxycyclohexanecarboxylate (1.26 grams) in the proportions of 1.5 moles of anhydride to 1 mole of diepoxide. The mixture was heated until homogeneous and maintained at a temperature of 110° C. and gelation occurred after 15 minutes. Upon curing for 2 hours at 110° C. and for an additional two-hour period at a temperature of 160° C. there was obtained an amber-colored resin having a Barcol hardness of 32.

Phthalic anhydride (1.11 grams) was mixed with 3,4-epoxycyclohexylmethyl 3,4-epoxycyclohexanecarboxylate (1.26 grams) in the proportions of 1.5 moles of anhydride to 1 mol of diepoxide. The mixture was heated until homogeneous and maintained at a temperature of 110° C. and gelation occurred within one hour. Upon curing for two hours at 110° C. and for an additional period of two hours at a temperature of 160° C. the amber-colored resin produced had a Barcol hardness of 30.

*Examples 17 through 57*

Tabulated below are various examples of the resin compositions produced in accordance with the process of this invention. These compositions were prepared in a manner similar to the previous examples. The table reflects the variation in physical properties with the addition of a modifying polycarboxylic acid compound, a variation in the mole ratio of reactants, a variation in the catalyst or the amount of catalyst employed.

TABLE II

| Example | Diepoxide, Wt. percent | Anhydride, Wt. percent | Modifier, Wt. percent | Mol Ratio | Catalyst, Wt. percent | Cure, Hrs. at Temp., °C. | Barcol Hardness | Heat Distortion, °C. | Izod Impact |
|---|---|---|---|---|---|---|---|---|---|
| 17 | a 73.7 | Succinic, 26.3 | None | 1:1 | None | 15.5–140 | 38 | 172 | 0. |
| 18 | a 71.2 | Succinic, 28.8 | do | 1:1.3 | do | 15.5–140 | 40 | 134 | 0. |
| 19 | a 65.0 | Succinic, 35.0 | do | 1:1.5 | do | 15.5–140 | 35 | 93 | |
| 20 | a 58.4 | Succinic, 41.6 | do | 1:2.0 | do | 15.5–140 | 21 | 90 | 0.4 |
| 21 | a 52.9 | {Methyl-tetra-hydrophthalic, 47.1} | do | 1:1.5 | 0.5 DMBA | 10–120 / 4–160 | | 165 | 0.3 |
| 22 | a 65.5 | Phthalic, 34.5 | do | 1:1 | 0.1 KOH | 2–120 / 4–160 | 38 | 209 | 0.2 |
| 23 | a 60.2 | Phthalic, 39.8 | do | 1:1.25 | 0.1 KOH | 2–120 / 4–160 | 37 | 200 | 0.3 |
| 24 | a 44.3 | Phthalic, 44.3 | do | 1:1.5 | 0.1 KOH | 2–120 / 4–160 | 33 | 192 | |
| 25 | a 65.5 | Phthalic, 34.5 | do | 1:1 | None | 3–140 / 4–160 / 4–180 | 37 | 198 | 0.2 |
| 26 | a 60.2 | Phthalic, 39.8 | do | 1:1.25 | do | 3–140 / 4–160 / 4–180 | 38 | 191 | 0.2 |
| 27 | a 55.7 | Phthalic, 44.3 | do | 1:1.5 | do | 3–140 / 4–160 / 4–180 | 35 | 172 | 0.9 |
| 28 | a 73.8 | Succinic, 26.2 | do | 1:1 | 0.007 KOH | 3–120 / 6–160 | | 193 | 0.3 |
| 29 | a 64.8 | Tetrahydrophthalic, 35.2 | do | 1:1 | 0.007 KOH | 3–120 / 6–160 | | 185 | 0.2 |
| 30 | a 71.0 | Glutaric, 29.0 | do | 1:1 | 0.007 KOH | 3–120 / 6.160 | | 145 | 0.5 |
| 31 | a 68.6 | Polyadipic, 31.4 | do | 1:1 | 0.007 KOH | 3–120 / 6–160 | | 93 | 0.3 |
| 32 | a 74.0 | Maleic, 26.0 | do | 1:1 | None | 19–120 / 3–160 | | 116 | 0.2 |
| 33 | a 68.0 | Chloromaleic, 32.0 | do | 1:1 | do | 19–120 / 3–160 | | 110 | 0.2 |
| 34 | a 62.7 | Dichloromaleic, 37.3 | do | 1:1 | do | 2–65 / 6–160 | 39 | 192 | 0.3 |
| 35 | a 54.5 | Hexahydrophthalic, 45.5 | do | 1:1.5 | 0.1 KOH | 4–120 / 6–160 | 37 | 200 | 0.2 |
| 36 | a 59.4 | {Hexahydrophthalic, 40.6} | do | 1:1.25 | 0.04 KOH | 6–120 / 6–160 | | 206 | 0.3 |
| 37 | a 65.4 | Phthalic, 34.6 | do | 1:1 | 0.004 KOH | 6–120 / 6–160 | | 216 | 0.3 |
| 38 | a 55.7 | Phthalic, 44.3 | do | 1:1.5 | 0.04 KOH | 6–120 / 6.100 | | 220 | 0.2 |
| 39 | a 60.2 | Phthalic, 39.8 | do | 1:1.25 | 0.02 KOH | 6–120 / 6–160 | 36 | 233 | 0.2 |
| 40 | a 55.9 | Phthalic, 44.2 | do | 1:1.5 | 0.07 KOH | 6–120 / 6–160 | 38 | 229 | 0.3 |
| 41 | a 52.0 | Phthalic, 48.0 | do | 1:1.75 | 0.07 KOH | 6–120 / 6–160 | 40 | 192 | 0.4 |
| 42 | b 63.1 | Phthalic, 36.9 | do | 1:1 | 0.002 KOH | 3–115 / 6–160 | 48 | 201 | |
| 43 | a 64.8 | Hexahydrophthalic, 35.2 | do | 1:1 | 0.16 SnCl₄ | 6–160 | 30 | 175 | 0.3 |
| 44 | a 38.4 | Chlorendic, 61.6 | do | 1:1.25 | | 6–160 | 30 | 140 | 0.2 |
| 45 | b 71.6 | Succinic, 28.4 | do | 1:1 | 0.004 KOH | 2–120 / 6–160 | 38 | 154 | 0.4 |
| 46 | a 61.0 | Chlorendic, 39.0 | do | 1:0.5 | 0.015 DMBA | 6–120 / 6–160 | 39 | 137 | 0.1 |
| 47 | a 60.3 | Chlorendic, 39.7 | do | 1:0.5 | 0.04 DMBA | 3–80 / 6–160 | 40 | 185 | 0.1 |
| 48 | a 52.0 | Chlorendic, 48.0 | do | 1:0.7 | 0.04 DMBA | 3–80 / 6–160 | 41 | 187 | 0.1 |
| 49 | a 45.6 | Chlorendic, 54.4 | do | 1:0.9 | 0.04 DMBA | 3–80 / 6–160 | 42 | 171 | 0.1 |
| 50 | a 43.0 | Chlorendic, 57.0 | do | 1:1 | 0.04 DMBA | 3–80 / 6–160 | 39 | 249 | 0.2 |
| 51 | a 37.7 | Chlorendic, 62.3 | do | 1:1.25 | 0.04 DMBA | 3–80 / 6–160 | 37 | 219 | 0.1 |
| 52 | a 33.5 | Chlorendic, 66.5 | do | 1:1.15 | 0.04 DMBA | 3–80 / 6–160 | 31 | 215 | 0.2 |
| 53 | a 71.7 | Phthalic, 19.0 | Adipic acid, 9.3 | 1:0.5:0.25 | | 4–130 / 4–160 | 36 | 170 | 0.4 |
| 54 | a 65.6 | Phthalic, 17.3 | Adipic acid, 17.1 | 1:0.5:0.5 | | 4–130 / 4–160 | 36 | 112 | 1.0 |
| 55 | a 72.4 | Phthalic, 18.9 | Glutaric acid,c 8.7 | 1:0.5:0.25 | | 3–120 / 6–160 | 37 | 200 | 0.6 |
| 56 | a 72.3 | Phthalic, 19.0 | Glutaric acid, 8.7 | 1:0.5:0.25 | | 2–120 / 6–160 | | 180 | 0.4 |
| 57 | a 69.4 | Phthalic, 25.6 | Glutaric acid, 5.0 | 1:0.7:0.15 | | 2–120 / 6–160 | 40 | 204 | 0.2 | a 3,4-epoxy-6-methylcyclohexylmethyl 3,4-epoxy-6-methylcyclohexanecarboxylate.
b 3,4-epoxycyclohexylmethyl 3,4-epoxycyclohexanecarboxylate.
c Contained 30% glutaric anhydride.
DMBA=dimethylbenzylamine.

*Example 58.—Reaction of phthalic anhydride and 3,4-epoxycyclohexanecarboxylates modified with the acid-ester of succinic acid and glycerol*

Phthalic anhydride (6.2 grams), 3,4-epoxy-6-methyl-cyclohexylmethyl 3,4-epoxy-6-methylcyclohexanecarboxylate (23.6 grams) and 5.2 grams of the acid-ester of succinic anhydride and glycerol (adduct of 3 moles of succinic anhydride and 1 mole of glycerol) were mixed in the proportions of 1 mole of diepoxide to 0.5 mole of anhydride to 0.17 mole of the acid ester. The mixture was heated until homogeneous and maintained at a temperature of 120° C. and gelation occurred in five minutes. Upon curing for two hours at 120° C. and for an additional six hours at 160° C. there was obtained a tough, pale-yellow-colored resin which had the following physical properties.

Heat distortion point,[1] 264 p.s.i. °C__ 184
Izod impact,[2] ft. lbs./in. notch, 25° C. 0.1

[1] ASTM Method D-648-45T.
[2] ASTM Method D-256-47T.

What is claimed is:

1. A polymerizable, curable, composition comprising (a) a 3,4-epoxycyclohexylmethyl 3,4-epoxycyclohexane-carboxylate corresponding to the structural formula:

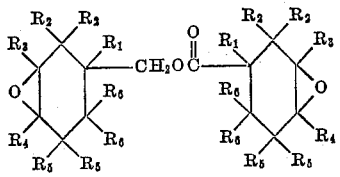

wherein $R_1$ through $R_6$ represent members selected from the group consisting of hydrogen and lower alkyl groups; (b) a polycarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide, wherein $x$ is a number in the range of from 0.1 to 4.0; $y$ is a number in the range from 0.0 to 1.0; the sum of $x$ and $y$ is not greater than 4.0 and $x/y$ is at least 1 when $y$ is greater than 0.0.

2. The polymerized, cured product obtained by heating the composition of claim 1.

3. A polymerizable, curable, composition comprising (a) a 3,4-epoxycyclohexylmethyl 3,4-epoxycyclohexane-carboxylate corresponding to the structural formula:

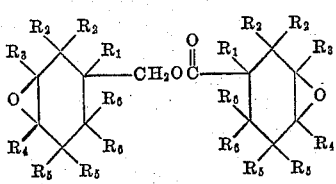

wherein $R_1$ through $R_6$ represent members selected from the group consisting of hydrogen and lower alkyl groups; (b) a polycarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide, wherein $x$ is a number in the range from 0.5 to 2.0; $y$ is a number in the range from 0.0 to 1.0; the sum of $x$ and $y$ is not greater than 2.0 and $x/y$ is at least 1 when $y$ is greater than 0.0.

4. A polymerizable, curable, composition comprising (a) a lower alkyl 3,4-epoxycyclohexylmethyl 3,4-epoxy-cyclohexanecarboxylate corresponding to the structural formula:

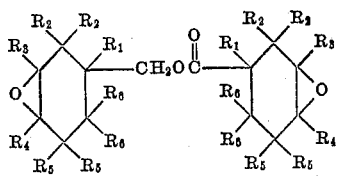

wherein $R_1$ through $R_6$ represent lower alkyl groups; (b) a polycarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide, wherein $x$ is a number in the range from 0.1 to 4.0; $y$ is a number in the range from 0.0 to 1.0; the sum of $x$ and $y$ is not greater than 4.0 and $x/y$ is at least 1 when $y$ is greater than 0.0.

5. A polymerizable, curable, composition comprising (a) 3,4-epoxy-6-methylcyclohexylmethyl 3,4-epoxy-6-methylcyclohexanecarboxylate; (b) a polycarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide, wherein $x$ is a number in the range of from 0.1 to 4.0; $y$ is a number in the range from 0.0 to 1.0; the sum of $x$ and $y$ is not greater than 4.0 and $x/y$ is at least 1 when $y$ is greater than 0.0.

6. A polymerizable, curable, composition comprising (a) 3,4-epoxycyclohexylmethyl 3,4-epoxycyclohexane-carboxylate; (b) a polycarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide, wherein $x$ is a number in the range of from 0.1 to 4.0; $y$ is a number in the range from 0.0 to 1.0; the sum of $x$ and $y$ is not greater than 4.0 and $x/y$ is at least 1 when $y$ is greater than 0.0.

7. A polymerizable, curable, composition comprising (a) 3,4-epoxy-1-methylcyclohexylmethyl 3,4-epoxy-1-methylcyclohexanecarboxylate; (b) a polycarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide, wherein $x$ is a number in the range of from 0.1 to 4.0; $y$ is a number in the range from 0.0 to 1.0; the sum of $x$ and $y$ is not greater than 4.0 and $x/y$ is at least 1 when $y$ is greater than 0.0.

8. A polymerizable, curable, composition comprising (a) 3,4-epoxy-2-methylcyclohexylmethyl 3,4-epoxy-2-methylcyclohexanecarboxylate; (b) a dicarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide, wherein $x$ is a number in the range of from 0.1 to 4.0; $y$ is a number in the range from 0.0 to 1.0; the sum of $x$ and $y$ is not greater than 4.0 and $x/y$ is at least 1 when $y$ is greater than 0.0.

9. A polymerizable, curable, composition comprising (a) 3,4-epoxy-6-methylcyclohexylmethyl 3,4-epoxy-6-methylcyclohexanecarboxylate; (b) a dicarboxylic acid anhydride in an amount having $x$ carboxyl equivalents per epoxy equivalent per said diepoxide; and (c) a polycarboxylic acid in an amount having $y$ carboxyl equivalents per epoxy equivalent of said diepoxide, wherein $x$ is a number in the range of from 0.5 to 2.0; $y$ is a number in the range from 0.0 to 1.0; the sum of $x$ and $y$ is not greater than 2.0 and $x/y$ is at least 1 when $y$ is greater than 0.0.

10. A polymerizable, curable, composition comprising (a) 3,4-epoxycyclohexylmethyl 3,4-epoxycyclohexane-carboxylate; (b) a dicarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide, wherein $x$ is a number in the range of from 0.5 to 2.0; $y$ is a number in the range from 0.0 to 1.0; the sum of $x$ and $y$ is not greater than 2.0 and $x/y$ is at least 1 when $y$ is greater than 0.0.

11. A polymerizable, curable, composition comprising (a) 3,4-epoxy-1-methylcyclohexylmethyl 3,4-epoxy-1-methylcyclohexanecarboxylate; (b) a dicarboxylic acid anhydride in an amount having $x$ carboxyl equivalents per epoxy equivalent of said diepoxide; and (c) a polycarboxylic acid in an amount having $y$ carboxyl equivalents per epoxy equivalent of said diepoxide, wherein $x$ is a number in the range of from 0.5 to 2.0; $y$ is a number in the range from 0.0 to 1.0; the sum of $x$ and $y$ is not greater than 2.0 and $x/y$ is at least 1 when $y$ is greater than 0.0.

12. A polymerizable, curable, composition comprising (a) 3,4-epoxy-2-methylcyclohexylmethyl 3,4-epoxy-2-methylcyclohexanecarboxylate; (b) a dicarboxylic acid anhydride in an amount having $x$ carboxyl equivalent per epoxy equivalent of said diepoxide; and (c) a polycarboxylic acid in an amount having $y$ carboxyl equivalents per epoxy equivalent of said diepoxide, wherein $x$ is a number in the range of from 0.5 to 2.0; $y$ is a number in the range from 0.0 to 1.0; the sum of $x$ and $y$ is not greater than 2.0 and $x/y$ is at least 1 when $y$ is greater than 0.0.

13. A polymerizable, curable composition comprising 3,4-epoxy-6-methylcyclohexylmethyl 3,4-epoxy-6-methylcyclohexanecarboxylate and succinic anhydride in an amount having 0.1 to 4.0 carboxyl equivalents per epoxy equivalent.

14. The polymerized, cured product obtained by heating the composition of claim 13.

15. A polymerizable, curable composition comprising 3,4-epoxy-6-methylcyclohexylmethyl 3,4-epoxy-6-methylcyclohexanecarboxylate and maleic anhydride in an amount having 0.1 to 4.0 carboxyl equivalents per epoxy equivalent.

16. The polymerized, cured product obtained by heating the composition of claim 15.

17. A polymerizable, curable composition comprising 3,4-epoxy-6-methylcyclohexylmethyl 3,4-epoxy-6-methylcyclohexanecarboxylate and dichloromaleic anhydride in an amount having 0.1 to 4.0 carboxyl equivalents per epoxy equivalent.

18. The polymerized, cured product obtained by heating the composition of claim 17.

19. A polymerizable, curable composition comprising 3,4-epoxy-6-methylcyclohexylmethyl 3,4-epoxy-6-methylcyclohexanecarboxylate and tetrahydrophthalic anhydride in an amount having 0.1 to 4.0 carboxyl equivalents per epoxy equivalent.

20. The polymerized, cured product obtained by heating the composition of claim 19.

21. A polymerizable, curable composition comprising 3,4 - epoxy - 6 - methylcyclohexylmethyl 3,4 - epoxy - 6-methylcyclohexanecarboxylate and phthalic anhydride in an amount having 0.1 to 4.0 carboxyl equivalents per epoxy equivalent.

22. The polymerized, cured product obtained by heating the composition of claim 21.

23. A polymerizable, curable composition comprising 3,4 - epoxy - 6 - methylcyclohexylmethyl 3,4 - epoxy - 6-methylcyclohexanecarboxylate and polymeric adipic anhydride in an amount having 0.1 to 4.0 carboxyl equivalents per epoxy equivalent.

24. The polymerized, cured product obtained by heating the composition of claim 23.

25. A polymerizable, curable composition comprising 3,4 - epoxy - 6 - methylcyclohexylmethyl 3,4 - epoxy - 6-methylcyclohexanecarboxylate and succinic anhydride in an amount having 0.1 to 4.0 carboxyl equivalents per epoxy equivalent, and adipic acid in an amount having from 0.0 to 1.0 carboxyl equivalent per epoxy equivalent.

26. The polymerized, cured product obtained by heating the composition of claim 25.

27. A polymerizable, curable, composition comprising 3,4 - epoxycyclohexylmethyl 3,4 - epoxycyclohexanecarboxylate and succinic anhydride in an amount having 0.1 to 4.0 carboxyl equivalents per epoxy equivalent.

28. The polymerized, cured product obtained by heating the composition of claim 27.

29. A polymerizable, curable, composition comprising 3,4 - epoxycyclohexylmethyl 3,4 - epoxycyclohexanecarboxylate and phthalic anhydride in an amount having 0.1 to 4.0 carboxyl equivalents per epoxy equivalent.

30. The polymerized, cured product obtained by heating the composition of claim 29.

31. A polymerizable, curable, composition comprising 3,4 - epoxy - 3 - methylcyclohexylmethyl 3,4 - epoxy - 3-methylcyclohexanecarboxylate and phthalic anhydride in an amount having 0.1 to 4.0 carboxyl equivalents per epoxy equivalent.

32. The polymerized, cured product obtained by heating the composition of claim 31.

33. A polymerizable, curable, composition comprising 3,4 - epoxy - 4 - methylcyclohexylmethyl 3,4 - epoxy - 4-methylcyclohexanecarboxylate and phthalic anhydride in an amount having 0.1 to 4.0 carboxyl equivalents per epoxy equivalent.

34. The polymerized, cured product obtained by heating the composition of claim 33.

35. A polymerizable, curable composition comprising 3,4 - epoxy - 6 - methylcyclohexylmethyl 3,4 - epoxy - 6-methylcyclohexanecarboxylate and tetrahydrophthalic anhydride in an amount having 0.1 to 4.0 carboxyl equivalents per epoxy equivalent.

36. The polymerized, cured product obtained by heating the composition of claim 35.

37. A polymerizable, curable composition comprising 3,4 - epoxy - 6 - methylcyclohexylmethyl 3,4 - epoxy - 6-methylcyclohexanecarboxylate and glutaric anhydride in an amount having 0.1 to 4.0 carboxyl equivalents per epoxy equivalent.

38. The polymerized, cured product obtained by heating the composition of claim 37.

39. A polymerizable, curable composition comprising 3,4 - epoxy - 6 - methylcyclohexylmethyl 3,4 - epoxy - 6-methylcyclohexanecarboxylate and chloromaleic anhydride in an amount having 0.1 to 4.0 carboxyl equivalents per epoxy equivalent.

40. The polymerized, cured product obtained by heating the composition of claim 39.

41. A polymerizable, curable composition comprising 3,4 - epoxy - 6 - methylcyclohexylmethyl 3,4 - epoxy - 6-methylcyclohexanecarboxylate and hexahydrophthalic anhydride in an amount having 0.1 to 4.0 carboxyl equivalents per epoxy equivalent.

42. A polymerized, cured product obtained by heating the composition of claim 41.

43. A polymerizable, curable composition comprising 3,4 - epoxy - 6 - methylcyclohexylmethyl 3,4 - epoxy - 6-methylcyclohexanecarboxylate and chlorendic anhydride in an amount having 0.1 to 4.0 carboxyl equivalents per epoxy equivalent.

44. The polymerized, cured product obtained by heating the composition of claim 43.

45. A polymerizable, curable composition comprising 3,4 - epoxy - 6 - methylcyclohexylmethyl 3,4 - epoxy - 6-methylcyclohexanecarboxylate and phthalic anhydride in an amount having 0.1 to 4.0 carboxyl equivalents per epoxy equivalent, and adipic acid in an amount having from 0.0 to 1.0 carboxyl equivalents per epoxy equivalent.

46. The polymerized, cured product obtained by heating the composition of claim 45.

47. A polymerizable, curable composition comprising 3,4 - epoxy - 6 - methylcyclohexylmethyl 3,4 - epoxy - 6-methylcyclohexanecarboxylate and phthalic anhydride in an amount having 0.1 to 4.0 carboxyl equivalents per epoxy equivalent, and glutaric acid in an amount having from 0.0 to 1.0 carboxyl equivalents per epoxy equivalent.

48. The polymerized, cured product obtained by heating the composition of claim 47.

49. A polymerizable, curable, composition comprising 3,4 - epoxycyclohexylmethyl 3,4 - epoxycyclohexanecarboxylate and phthalic anhydride in an amount having 0.1 to 4.0 carboxyl equivalents per epoxy equivalent, and a succinic acid-glycerol acid-ester in an amount having 0.0 to 1.0 carboxyl equivalents per epoxy equivalent.

50. The polymerized, cured product obtained by heating the composition of claim 49.

51. A polymerizable, curable composition comprising 3,4 - epoxy - 6 - methylcyclohexylmethyl 3,4 - epoxy - 6-methylcyclohexanecarboxylate and hexachloroendomethylene-tetrahydrophthalic anhydride in an amount having 0.1 to 4.0 carboxyl equivalents per epoxy equivalent.

52. The polymerized, cured product obtained by heating the composition of claim 51.

53. Polymerizable, curable, compositions comprising (a) a 3,4-epoxycyclohexylmethyl 3,4-epoxycyclohexane-carboxylate corresponding to the structural formula:

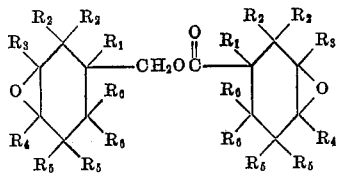

wherein $R_1$ through $R_6$ represent members selected from the group consisting of hydrogen and lower alkyl groups; (b) a polycarboxylic acid anhydride selected from the group consisting of aliphatic, aromatic and cycloaliphatic polycarboxylic acid anhydrides in an amount having $x$ carboxyl equivalents per epoxy equivalent of said diepoxide; and (c) a polycarboxylic acid selected from the group consisting of aliphatic, aromatic and cycloaliphatic polycarboxylic acids in an amount having $y$ carboxyl equivalents per epoxy equivalent of said diepoxide wherein $x$ is a number in the range of from 0.1 to 4.0; $y$ is a number in the range of from 0.0 to 1.0; the sum of $x$ and $y$ is not greater than 4.0 and $x/y$ is at least 1.0 when $y$ is greater than 0.0.

54. The polymerized, cured product obtained by heating the compositions of claim 53.

References Cited in the file of this patent
UNITED STATES PATENTS

| | | |
|---|---|---|
| 2,623,023 | Koroly | Dec. 23, 1952 |
| 2,712,535 | Fisch | July 5, 1955 |
| 2,716,123 | Frostick et al. | Aug. 23, 1955 |
| 2,720,500 | Cody | Oct. 11, 1955 |
| 2,764,575 | Kohler et al. | Sept. 25, 1956 |
| 2,768,153 | Shokal | Oct. 23, 1956 |

UNITED STATES PATENT OFFICE
CERTIFICATE OF CORRECTION

June 9, 1959

Patent No. 2,890,210

Benjamin Phillips et al

It is hereby certified that error appears in the printed specification of the above numbered patent requiring correction and that the said Letters Patent should read as corrected below.

Column 14, line 41, for "per said" read -- of said --.

Signed and sealed this 19th day of April 1960.

(SEAL)
Attest:

KARL H. AXLINE
Attesting Officer

ROBERT C. WATSON
Commissioner of Patents